(12) United States Patent
Peterson et al.

(10) Patent No.: US 12,461,378 B1
(45) Date of Patent: Nov. 4, 2025

(54) NIGHTTIME HEADS UP DISPLAY UNIT APPARATUSES, SYSTEMS, AND METHODS

(71) Applicant: KOPIN CORPORATION, Westborough, MA (US)

(72) Inventors: Nicolas Steven Peterson, Gilmanton, NH (US); Michael James Hoppe, Vista, CA (US)

(73) Assignee: KOPIN CORPORATION, Westborough, MA (US)

( * ) Notice: Subject to any disclaimer, the term of this patent is extended or adjusted under 35 U.S.C. 154(b) by 0 days.

(21) Appl. No.: 18/972,742

(22) Filed: Dec. 6, 2024

Related U.S. Application Data

(60) Provisional application No. 63/663,101, filed on Jun. 22, 2024.

(51) Int. Cl.
   *H04N 23/20* (2023.01)
   *F41G 1/38* (2006.01)
   (Continued)

(52) U.S. Cl.
   CPC ....... *G02B 27/0189* (2013.01); *G09G 3/3208* (2013.01); *H04N 23/20* (2023.01);
   (Continued)

(58) Field of Classification Search
   CPC .. G02B 27/0189; H04N 23/20; G09G 3/3208; G09G 2320/0626; G09G 2340/10; F41G 1/38
   See application file for complete search history.

(56) References Cited

U.S. PATENT DOCUMENTS

| 7,541,581 B2 | 6/2009 | Reed et al. |
| 11,092,796 B2 | 8/2021 | Hodelin et al. |

(Continued)

FOREIGN PATENT DOCUMENTS

| CA | 3108899 | * | 8/2019 |
| CA | 3229264 | * | 10/2022 |

(Continued)

OTHER PUBLICATIONS

POMBO translation of CN 110300910 Dec. 6, 2017 (Year: 2017).*
MUROTA translation of JP H07192198 Oct. 6, 1994 (Year: 1994).*
BONY translation of CA 3229264 Oct. 28, 2022 (Year: 2022).*

*Primary Examiner* — Zaihan Jiang
(74) *Attorney, Agent, or Firm* — PELOQUIN, PLLC; Mark S. Peloquin, Esq.

(57) ABSTRACT

Apparatus and methods are taught to optically fuse first output light containing visual data with second output light emitted from a night vision device. A waveguide display is aligned relative to an eyepiece of the night vision device. When the waveguide display is in an ON state and second output light exits the eyepiece, the second output light passes through the waveguide display. A display has an input and is configured to receive a display input signal containing visual data. The display is configured to emit light responsive to the display input signal. An optical device is disposed between the display and the waveguide display. The optical device couples emitted light from the display into the waveguide display. When in the ON state, the waveguide display emits first output light which optically fuses with second output light.

54 Claims, 18 Drawing Sheets

(51) Int. Cl.
  *G02B 27/01* (2006.01)
  *G09G 3/3208* (2016.01)
(52) U.S. Cl.
  CPC ....... *F41G 1/38* (2013.01); *G09G 2320/0626* (2013.01); *G09G 2340/10* (2013.01)

(56) References Cited

U.S. PATENT DOCUMENTS

| | | | |
|---|---|---|---|
| 11,922,586 B1* | 3/2024 | Pohl | F41G 1/30 |
| 2013/0208352 A1 | 8/2013 | Simmonds et al. | |
| 2017/0343803 A1* | 11/2017 | Tonar | G02B 27/0101 |
| 2018/0105114 A1* | 4/2018 | Geerlings | G02F 1/157 |
| 2020/0400946 A1* | 12/2020 | Waldern | G02B 6/0016 |
| 2021/0262758 A1 | 8/2021 | Parker et al. | |
| 2021/0356635 A1 | 11/2021 | Babington | |
| 2021/0361020 A1 | 11/2021 | Keith et al. | |
| 2022/0099978 A1* | 3/2022 | Eash | G02B 27/283 |
| 2022/0252767 A1* | 8/2022 | Fuller | F41G 1/08 |
| 2022/0269075 A1* | 8/2022 | Yang | G02B 27/0103 |
| 2022/0269076 A1* | 8/2022 | Yang | G02B 6/0016 |
| 2023/0179753 A1* | 6/2023 | Leighton | H04N 13/246 348/47 |

FOREIGN PATENT DOCUMENTS

| | | | |
|---|---|---|---|
| CN | 110300910 | * | 12/2017 |
| JP | H07192198 | * | 10/1994 |
| WO | WO 2005/015285 A2 | | 2/2005 |

* cited by examiner

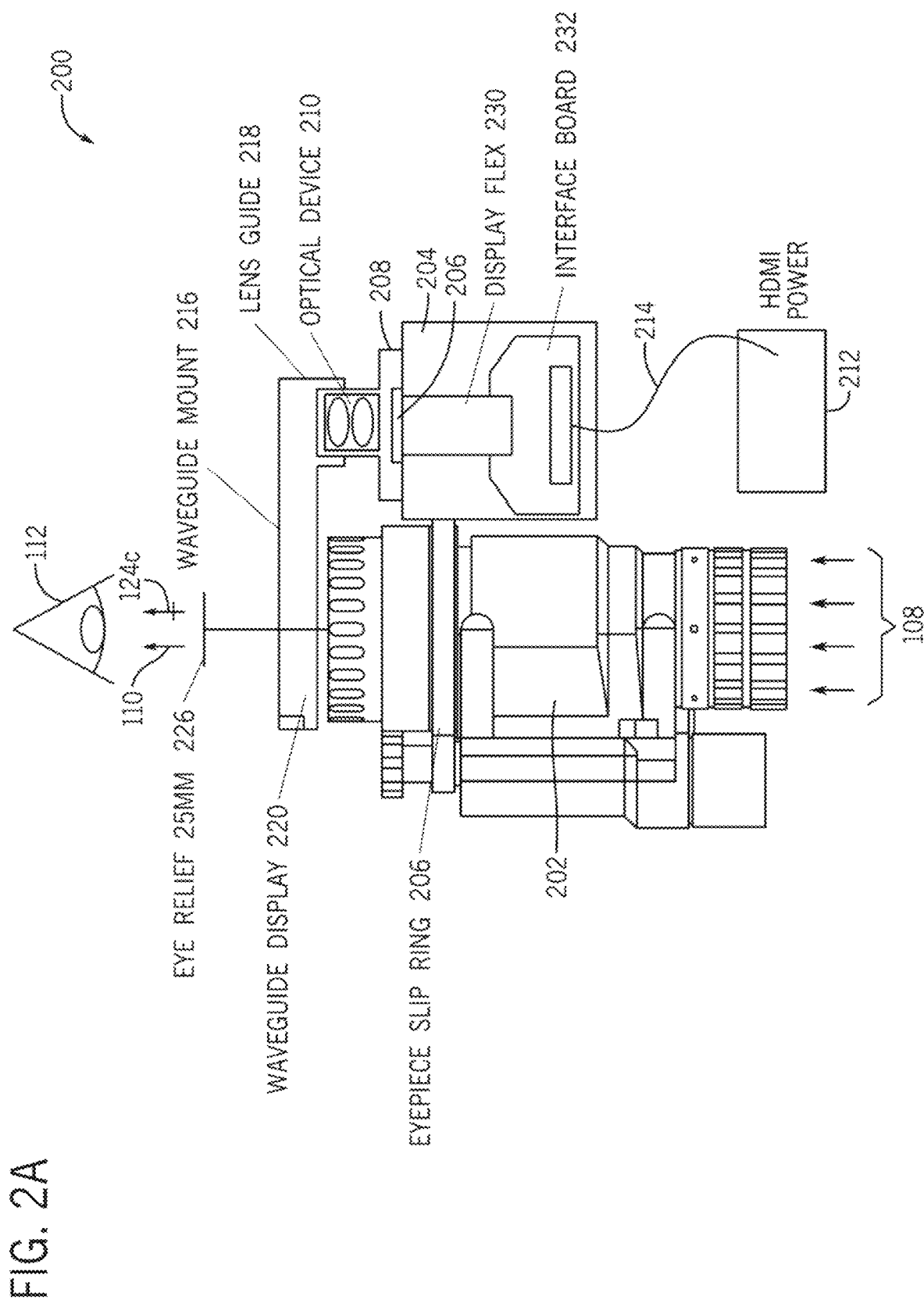

NIGHTTIME HEADS UP DISPLAY UNIT APPARATUSES, SYSTEMS, AND METHODS

RELATED APPLICATIONS

This patent application claims priority from United States Provisional Patent Application titled: "DAY AND NIGHT HEADS UP DISPLAY (DANHUD) UNIT APPARATUSES, SYSTEMS, AND METHODS," filed on Jun. 22, 2024, Ser. No. 63/663,101.

U.S. Provisional Patent Application Ser. No. 63/663,101 is hereby incorporated by reference.

BACKGROUND OF THE INVENTION

1. Field of the Invention

The invention relates generally to wearable devices which combine digital information together with a view of the environment to provide readable augmented reality.

2. Art Background

Wearable heads-up display devices used at night, with for example, night vision goggles (NVG), are used to provide digital data to a user through an augmented reality device referred to as a "clip-on" device. Such clip-on devices typically inject light into a NVG's objective lens transmitting only a single color of light (monochrome light) to a user. This can present a problem. Such clip-on architecture with respect to light injection into a night vision google can result in "tube burn-in." This can create a problem.

BRIEF DESCRIPTION OF THE DRAWINGS

The invention may best be understood by referring to the following description and accompanying drawings that are used to illustrate embodiments of the invention. The invention is illustrated by way of example in the embodiments and is not limited in the figures of the accompanying drawings, in which like references indicate similar elements.

FIG. 2A illustrates a hardware configuration for a nighttime device, according to embodiments of the invention.

DETAILED DESCRIPTION

Figure 1:
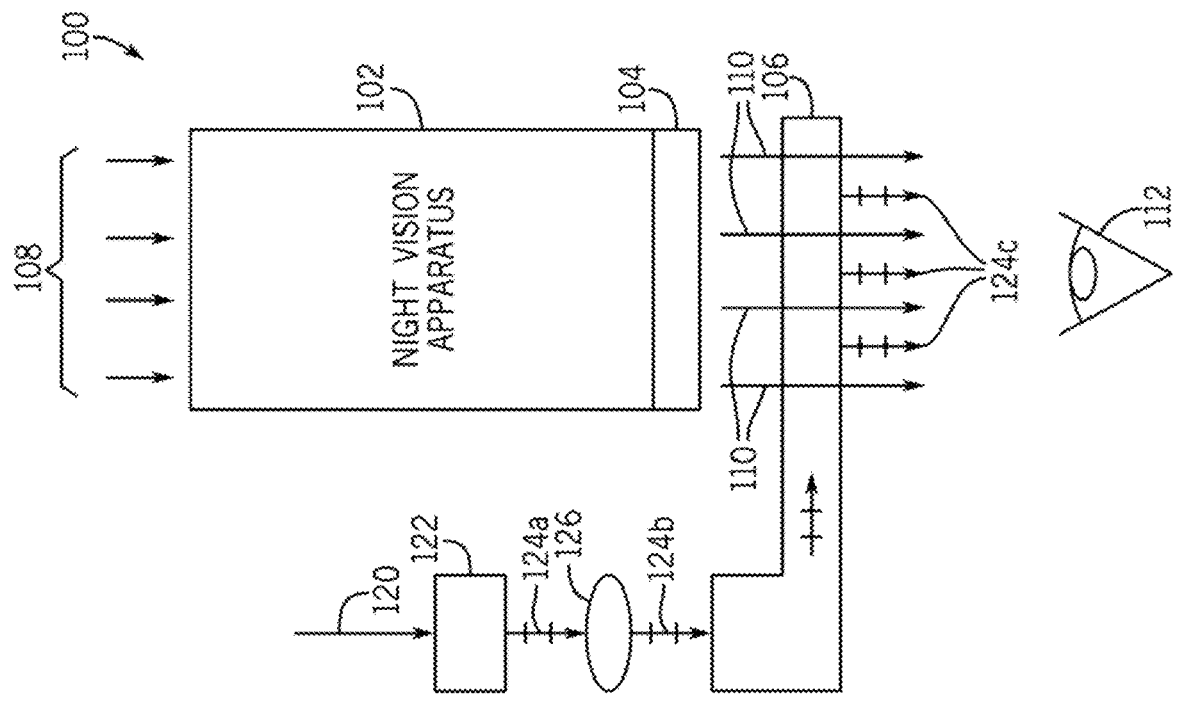
FIG. 1 illustrates optical fusion of image data, according to embodiments of the invention.

In the following detailed description of embodiments of the invention, reference is made to the accompanying drawings in which like references indicate similar elements, and in which is shown by way of illustration, specific embodiments in which the invention may be practiced. These embodiments are described in sufficient detail to enable those of skill in the art to practice the invention. In other instances, well-known circuits, structures, and techniques have not been shown in detail in order not to obscure the understanding of this description. The following detailed description is, therefore, not to be taken in a limiting sense, and the scope of the invention is defined only by the appended claims.

Apparatuses, methods, and systems are described for utilizing a nighttime heads-up display device with a head-wearable device or a non-head-wearable device to provide an augmented reality view to a user. In various embodiments, an Organic Light Emitting Diode (OLED) display is used to bring display light carrying "data" to a user's eyes while the user maintains real forward vision. As used in this description of embodiments, the term "data" is understood to mean one or more or all of the following; text, symbols, maps, images, and full motion video.

As used in this description of embodiments, a head-wearable device includes any type of device that can be worn on a user's head, such as but not limited to, eyewear devices such as glasses or devices mounted to a helmet. Embodiments of the invention are utilized with devices such as goggles, helmets, visors, etc. Therefore, as used in this description of embodiments wearable or head wearable is to be afforded a broad meaning and can be used interchangeably.

Embodiments of the invention are also readily configurable into non-head wearable devices such as a gun site.

As used in this description of embodiments, the terms "nighttime device," "Dark Wave device," and "Night WAVE device" are used interchangeably with no limitation implied thereby.

Systems and methods are taught herein that utilize a nighttime device that is hot swappable into a head wearable device such as a helmet, etc. The nighttime device provides digital data to a user thereby providing an augmented reality view to the user during night operation. In various embodiments, Organic Light Emitting Diode (OLED) displays are used in the nighttime device.

It has been discovered that use of a waveguide display for the nighttime device provides a tactical advantage because when used with the brightness levels attendant upon the night vision apparatus (e.g., night vision goggles) the waveguide display's brightness in the nighttime device is so low that artifacts are not visible. It has been discovered that an OLED display coupled to a waveguide display provides sufficient brightness in the nighttime device for use by a user in a nighttime environment. Thus, a waveguide display is used in the nighttime device to provide an augmented reality view to the user with no reduction in situational awareness to the user.

Power savings over existing LCOS and DLP display technology is achieved through the use of the OLED display in the nighttime device. In some embodiments an 80% power savings is achieved over LCOS or DLP displays.

"Clip-In" Nighttime Device (Night WAVE)

In various embodiments, a "clip-in" nighttime device is constructed for use with existing night vision apparatuses, such as but not limited to, PVS-14 night vision goggles, etc. The PVS-14 or AN/PVS-14 is a passive, head or helmet mounted device that enhances ambient light and near infrared energy to allow a user to see during night operations. Such devices can also be used as a weapon site or for low light photography. The nighttime device can be used with any "dumb" night vision apparatus that does not have a channel to feed digital information into a user's view. In various embodiments, the nighttime device can also be used with "smart" night vision apparatuses that have their own built-in display for digital data. When used with a smart night vision apparatus it is advantageous to ensure that a display area from the smart night vision apparatus does not overlap with a display area provided by the waveguide display of the nighttime device. Thus, in various embodiments, nighttime devices can be used with both "dumb" and "smart" existing night vision apparatuses.

The term "clip-in" refers to placing a waveguide display of the nighttime device between an external surface of the night vision apparatus's eyepiece and the user's eye. In various embodiments, an Organic Light Emitting Diode (OLED) display is used to generate the light energy that is input to the waveguide display for presentation of data to the user. In various embodiments, OLED displays are constructed as monochrome displays or as full color displays. The clip-in architecture solves the problem of "burn-in" that exists with existing "clip-on" night vision apparatuses. Clip-on night vision apparatuses allow light used to create the digital information to pass within the night vision apparatus which can damage the night vision apparatus over time. "Clip-in" architecture eliminates light carrying the data from passing within the night vision apparatus, thereby eliminating undesirable burn-in.

FIG. 1 illustrates, generally at 100, optical fusion of image data according to embodiments of the invention. With reference to FIG. 1, a system is configured to optically fuse first output light 124c originating at a display 122 with second output light 110 from a night vision apparatus 102.

First output light 124c is created by providing a display input signal 120 as an input to a display 122. The display 122 emits first output light 124a into an optical device 126. The optical device 126 is designed to couple first output light 124b into a waveguide display 106. First output light 124b exits the waveguide display as first output light 124c. Note that only a single ray of light is illustrated with 124a and 124b to preserve clarity in the illustration. Those of ordinary skill in the art will recognize that light is emitted from a surface of the display 122 thereby producing a plurality of rays of light that are incident upon the optical device 126 and are then coupled into the waveguide display 106.

A night vision apparatus 102 is configured to receive light 108 from the environment, amplify the light and output second output light 110 from an eyepiece 104. The second output light 110 passes through the waveguide display 106 thereby optically fusing with the first output light 124c. The fusion of the first output light 124c and the second output light 110 is presented to a user 112.

FIG. 2A illustrates, generally at 200, a hardware configuration for a nighttime device, according to embodiments of the invention. With reference to FIG. 2A, a "clip-in" nighttime device is illustrated for use with an existing night vision apparatus 202. In one or more embodiments, the night vision apparatus 202 is a PVS-14 apparatus, which is used for illustration only and does not limit embodiments of the invention. Mechanical attachment of the nighttime device to the night vision apparatus 202 is provided by an eyepiece slip ring 206 thereby locating a housing 204 (or equivalently described as a mount 204) proximate to the night vision apparatus 202. The housing 204 is configured for mounting a display 206 thereon, optics 210 for coupling light emitted from the display 206 into a waveguide display 220, an optics mount 208, a lens guide 218, and a waveguide mount 216.

The optics mount 208 is configured to accommodate one or more optical elements 210. The waveguide mount 216 is configured to accommodate the waveguide display 220. In various embodiments, the housing 204 is configured to accommodate power 212 and other electronics, such as, but not limited to a cable to provide a video signal (such as the display input signal 120 FIG. 1) to the display 206, an interface board 232 and a display flex cable 230 all within a single enclosure. In some embodiments, one or more connectors are provided in the housing 204 to provide eternal signal input. In other embodiments one or more electronic components are packaged separately from the housing 204. Thus, the illustration in FIG. 2A is to be afforded flexible application and does not limit embodiments of the invention.

In one or more embodiments, assembly of the nighttime includes bonding the display 206 to the optics mount 208. The optical device 210 is screwed into the optics mount 208 until the display image is brought into focus. The waveguide mount 216 is attached to the optics mount 208 in some embodiments the two are screwed together. The housing 204 can be articulated on the night vision apparatus 202 via the eyepiece slip ring 206 and fastened in place thereby preventing rotation once alignment for a user is achieved. The waveguide mount 216 slips over the waveguide 220. A mechanical alignment feature aligns the waveguide display 220 with an eyepiece of the night vision apparatus 202.

In operation, first output light 124c exits the nighttime device from the waveguide display 220. First output light is generated using a display input signal, the display 206, and is guided along an optical path provided by the optical device 210 and the waveguide display 220 finally exiting the waveguide display at 124c.

Second output light 110 results from amplification of environmental light 108 by the night vision apparatus 202. A user 112 observes the optical fusion of the first output light 124c and the second output light 110 when the user 112 is positioned relative to the eye relief 226. In one or more embodiments, the eye relief is approximately 25 millimeters.

In one or more embodiments the display 122 (FIG. 1) or 206 (FIG. 2A) is an OLED display. Use of the OLED display in the nighttime device provides a significant reduction in power consumption over existing LCOS and DLP display technology. In various embodiments, an OLED display is made with a chosen resolution for a nighttime device, such as but not limited to, 1280×720 pixels, 1280×960 pixels, 720×720 pixels, etc.

In various embodiments of the invention, existing waveguide displays can be used for the waveguide shown in FIG. 2A. Waveguides from companies such as Vuzix, Dispelix, or Lumus can be used. In addition, a custom waveguide can be manufactured for use as the waveguide shown in the figures. A waveguide from Vuzix was used for the demonstration system described herein.

Figure 2B:
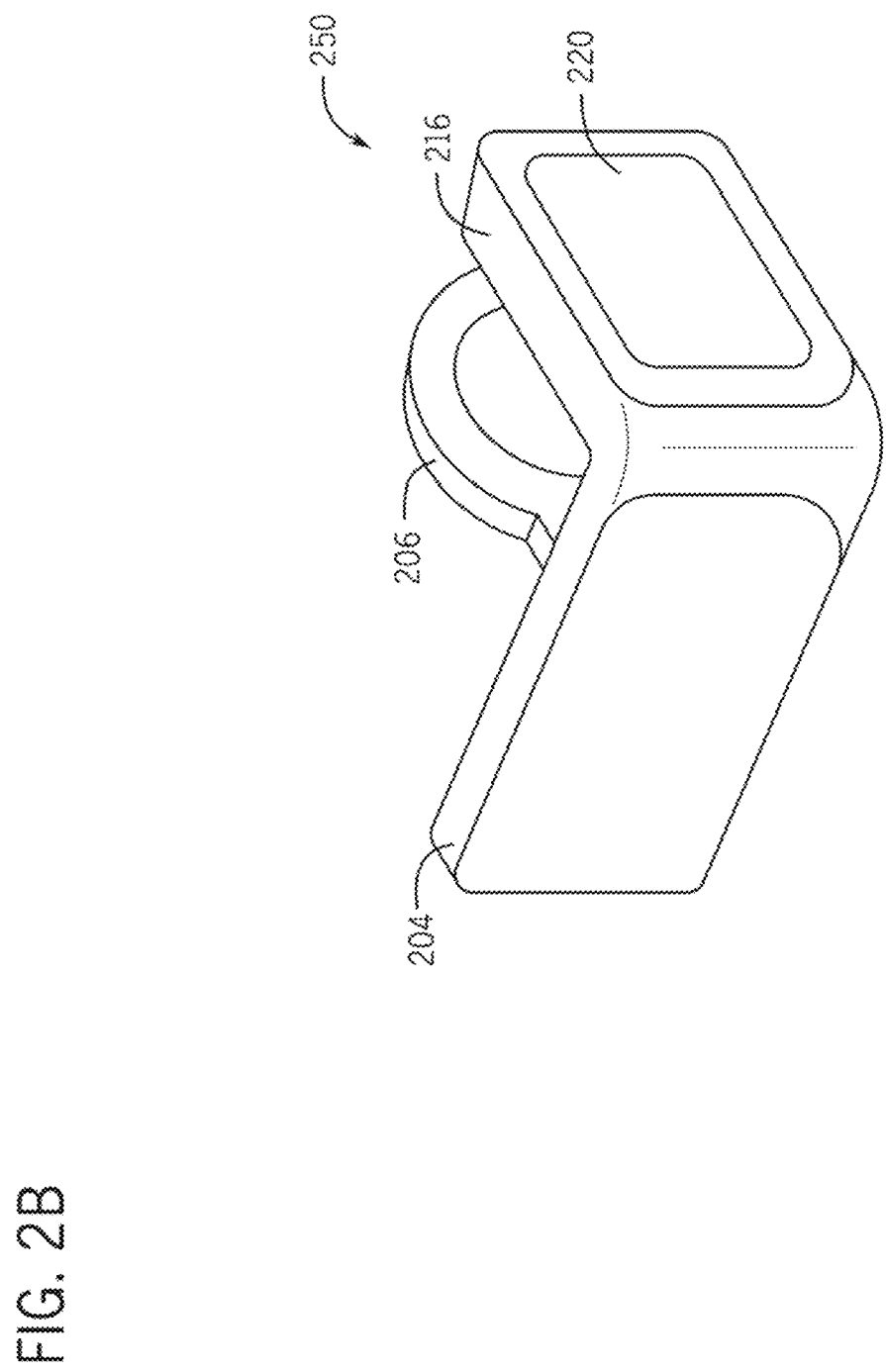
FIG. 2B illustrates an isometric view of a nighttime device following the teaching of FIG. 2A, according to embodiments of the invention.

FIG. 2B illustrates an isometric view of a nighttime device following the teaching of FIG. 2A, according to embodiments of the invention.

In various embodiments, the nighttime device is coupled to a night vision apparatus, such as 202 shown in FIG. 2A. The combination is used in various embodiments with various head wearable devices. One such head wearable device is a helmet as illustrated in, for example, FIG. 9B below.

Figure 3:
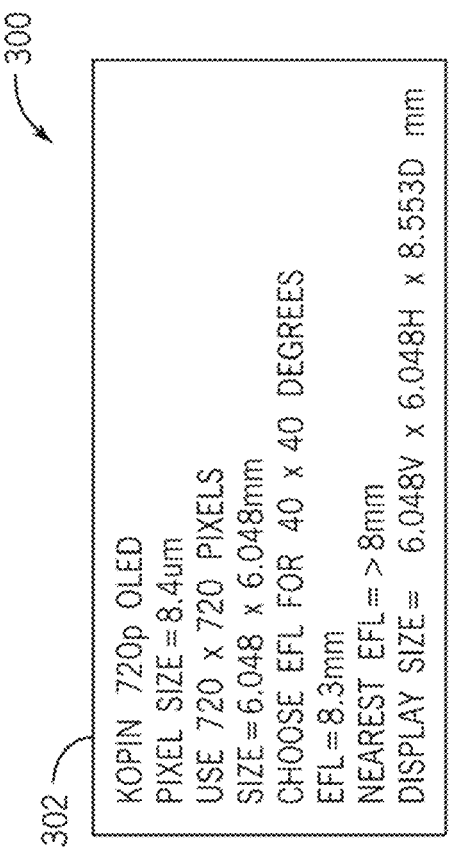
FIG. 3 illustrates some specifications for a nighttime device, according to embodiments of the invention.

FIG. 3 illustrates, generally at 300, some specifications for a nighttime device, according to embodiments of the invention. With reference to FIG. 3, the specifications 302 shown therein are applicable to the system shown in FIG. 2A.

In one or more embodiments an OLED with a resolution of 720P is used for the display. Such a display can have a pixel size of 8.4 micrometers with 720 rows and 720 columns of pixels used to form the display. A planar area of the resulting display is 6.048×6.048 millimeters. An effective focal length (EFL) of 8.3 millimeters is calculated to provide a field of view measuring 40 degrees by 40 degrees. The nearest EFL to 8.3 millimeters was chosen to be 8 millimeters in one embodiment. The resulting display size is 6.048 millimeters vertical dimension by 6.048 millimeters horizontal dimension by 8.553 millimeters in depth. The specifications for the nighttime device shown in FIG. 3 are given by way of example and do not limit embodiments of the invention. In other embodiments different specifications result.

Figure 4:
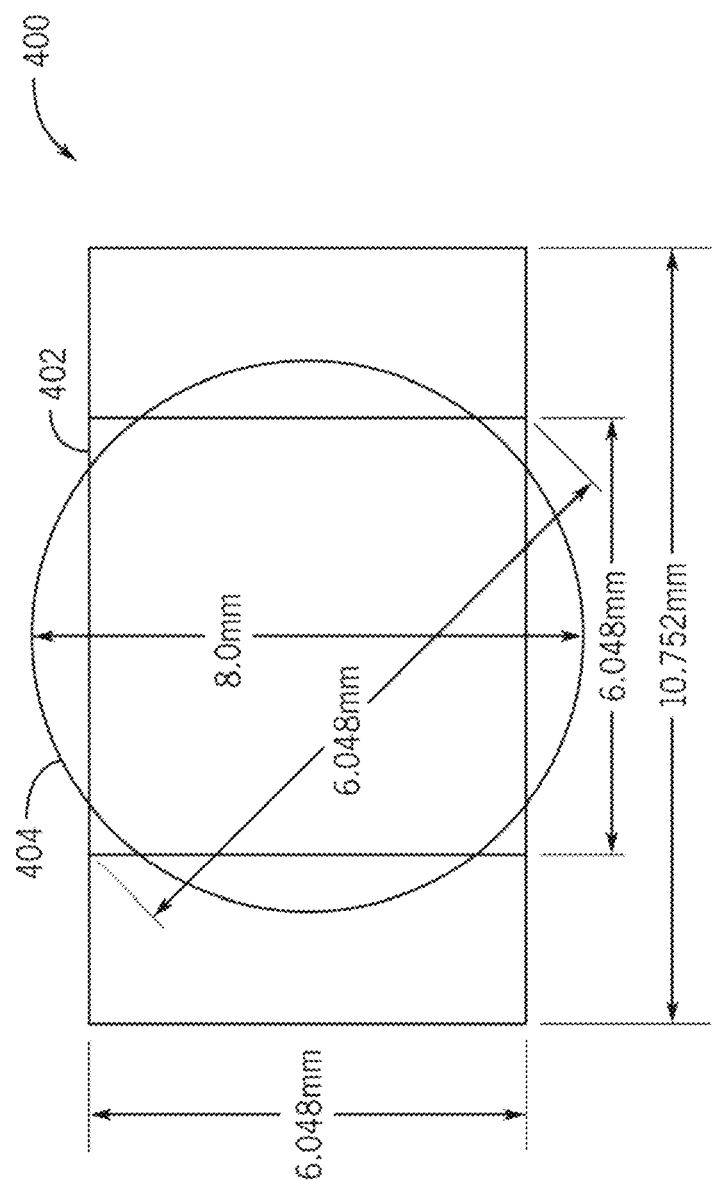
FIG. 4 illustrates some OLED image sensor format sizes for a nighttime device, according to embodiments of the invention.

FIG. 4 illustrates, generally at 400, display area and lens coverage area for a nighttime device, according to embodiments of the invention. With reference to FIG. 4, an OLED display area is indicated at 402. An optical device having a nominal diameter of 0.5 inch has a coverage area indicated by a circle 404. The optical device is, for example, 126 FIG. 1 or 210 in FIG. 2A. A different optical device having a different coverage area could have been selected for use with the OLED display described in FIG. 3 above. The specifications, sizes, display areas, lens coverage areas, etc. for the nighttime device shown in FIG. 3 and FIG. 4 are given by way of example and do not limit embodiments of the invention.

Figure 5:
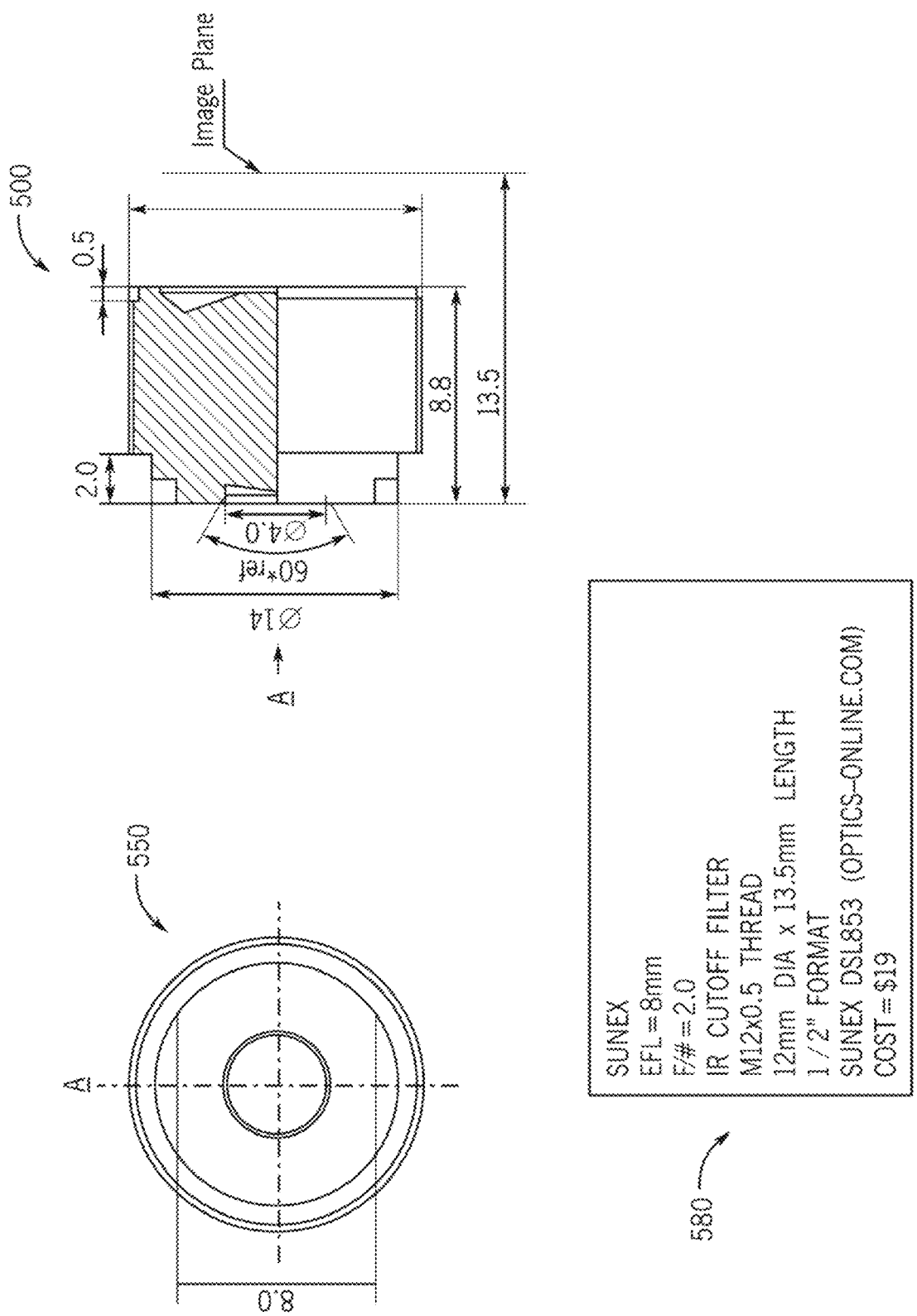
FIG. 5 illustrates some optical elements used in a nighttime device, according to embodiments of the invention.

FIG. 5 illustrates some of the optical elements used in a nighttime device, according to embodiments of the invention. With reference to FIG. 5, an example of optical device 210 used to couple light from the OLED display into a waveguide display, as shown in FIG. 2A, or optical device 126 (FIG. 1) is illustrated with an optical element from SUNEX. For example, a SUNEX DSL853 lens is illustrated in a cross-sectional view 500 and in an end view A at 550. Specifications for the SUNEX DSL853 are listed in 580. The specifications, format sizes, etc. for the nighttime device shown in FIG. 5 are given by way of example and do not limit embodiments of the invention.

Figure 6:
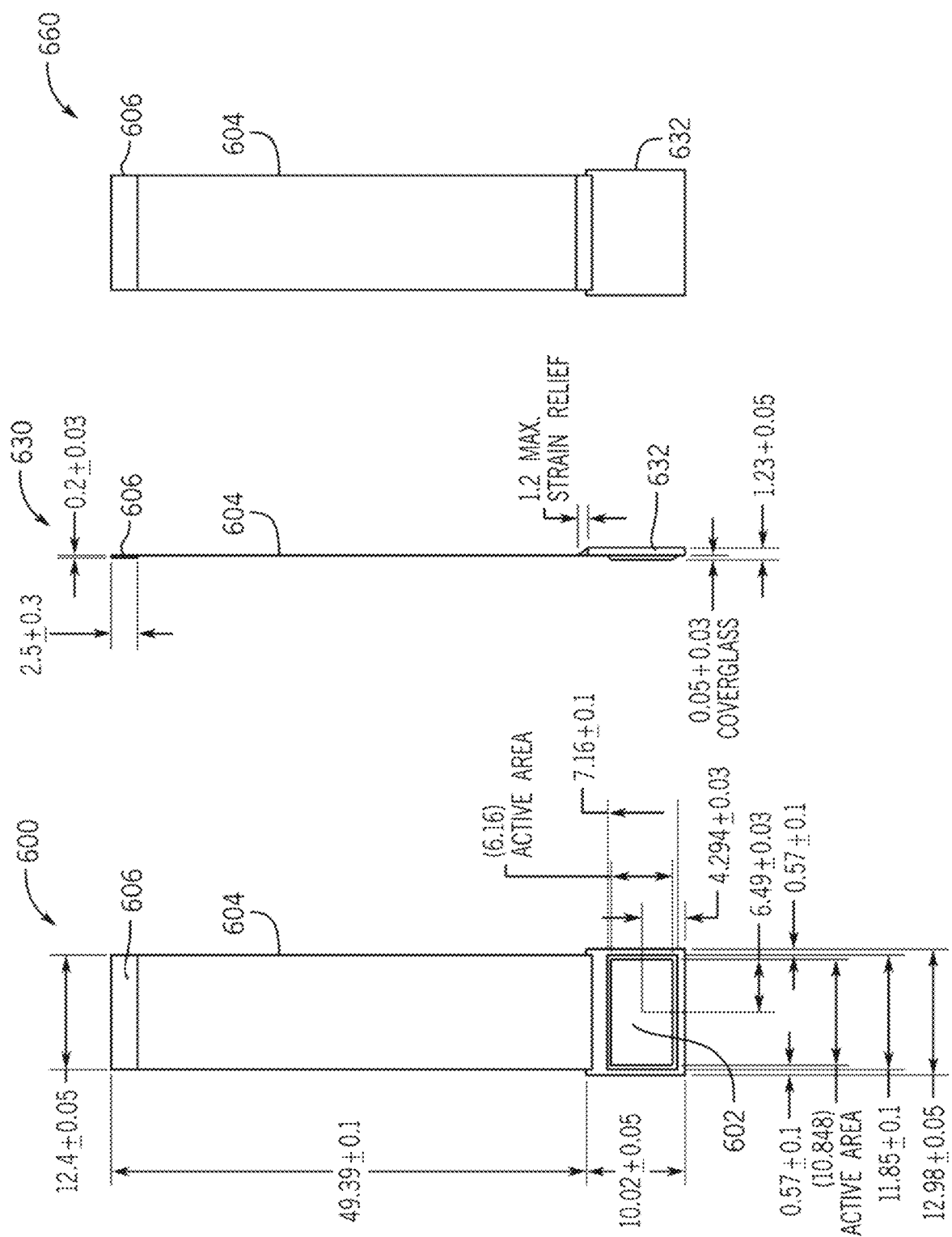
FIG. 6 illustrates some OLED display dimensions used in a nighttime device, according to embodiments of the invention.

FIG. 6 illustrates some OLED display dimensions used in a nighttime device, according to embodiments of the invention. With reference to FIG. 6, the data for the OLED display shown therein are applicable to the system shown in FIG. 1 or FIG. 2A. An OLED display assembly 600 is illustrated with an OLED display 602 having a display flex cable 604 attached thereto at one end, the display flex cable 604 terminates in a connector 606 at a second end. The display flex cable 604 can be used for display flex 230 in FIG. 2A. A side view of the display assembly is illustrated at 630 with attached cover glass indicated at 632. A plan view of the display assembly is illustrated at 660. In the example presented in FIG. 6, the OLED display has overall package dimensions of 13 millimeters by 13 millimeters with glass dimensions of 7.16 millimeters by 11.85 millimeters. The data for the nighttime device shown in FIG. 6 are given by way of example and do not limit embodiments of the invention.

Figure 7:
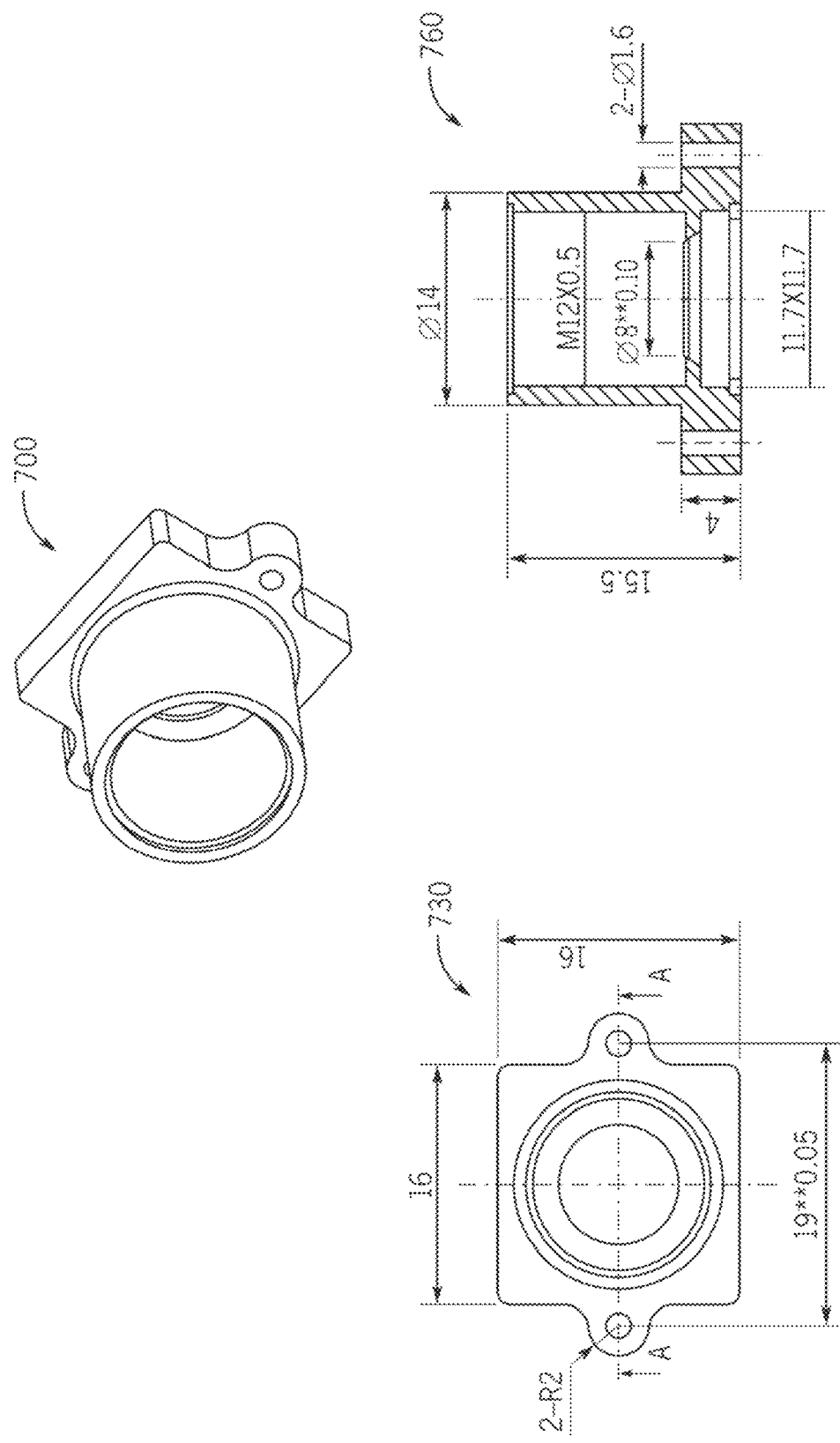
FIG. 7 illustrates an example of a lens mount used in a nighttime device, according to embodiments of the invention.

FIG. 7 illustrates an example of a lens mount used in a nighttime device, according to embodiments of the invention. With respect to FIG. 7, the CMT107 lens mount from SUNEX is used with the optics shown in FIG. 5 to couple light from the OLED display into the waveguide display as shown in FIG. 1 or FIG. 2A above. For example, in one or more embodiments, the lens mount illustrated in FIG. 7 is used for the optics mount 208 in FIG. 2A. An isometric view of the lens mount is illustrated at 700. A top view of the CMT107 lens mount is illustrated at 730 and a cross-sectional view of the CMT107 lens mount is illustrated at 760. The CMT107 lens mount has an 8 millimeter circular output and covers a 40 degree circular field of view. The CMT107-WG is available from (optics-online.com). The lens mount shown in FIG. 7 is given by way of example and does not limit embodiments of the invention.

Figure 8:
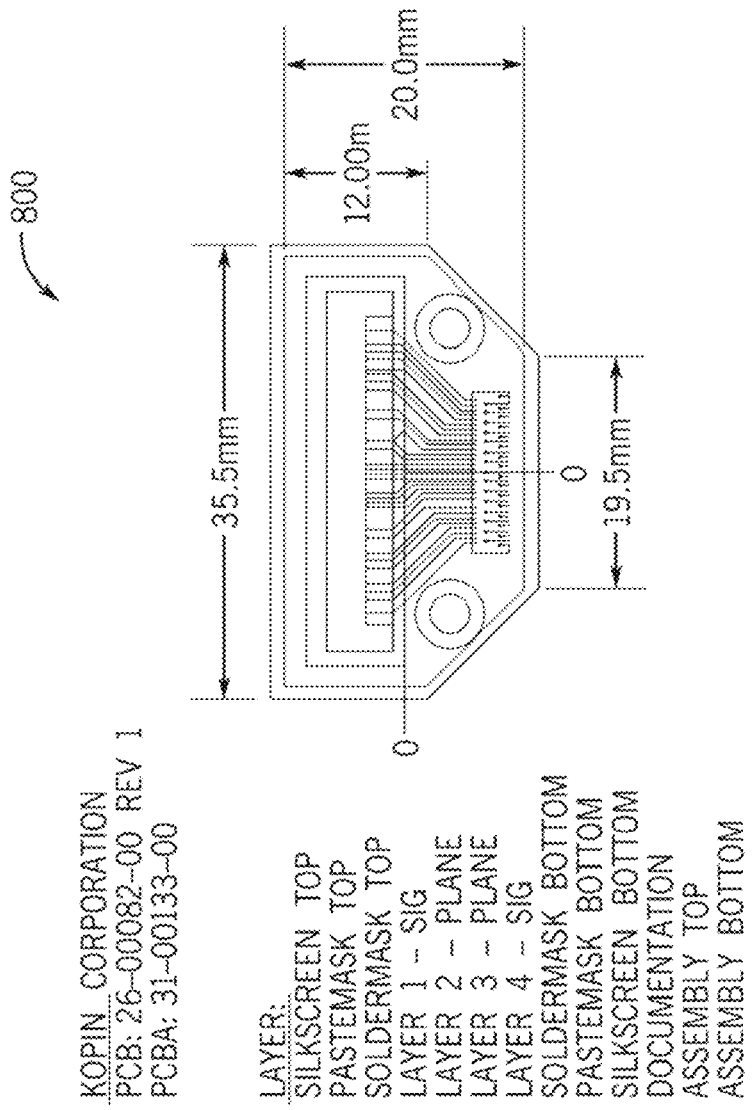
FIG. 8 illustrates an example of an OLED interface board used in a nighttime device, according to embodiments of the invention.

FIG. 8 illustrates, generally at 800, an example of an OLED interface board used in a nighttime device, according to embodiments of the invention. With reference to FIG. 8, the OLED interface board is a detailed view of the interface board 232 shown in FIG. 2A. The OLED interface board shown in FIG. 8 is given by way of example and does not limit embodiments of the invention.

Figure 9A:
FIG. 9A illustrates, generally at 900, an augmented reality view a user can see when using a nighttime device, according to embodiments of the invention.

FIG. 9A illustrates, generally at 900, an augmented reality view a user can see when using a nighttime device, according to embodiments of the invention. With reference to FIG. 9A, a nighttime device, such as one described in conjunction with the figures above, displays a full color output of digital data 904 optically fused into a view of the environment 902 thereby providing an augmented reality view. However, in other embodiments digital data can be presented to the user in monochrome.

Figure 9B:
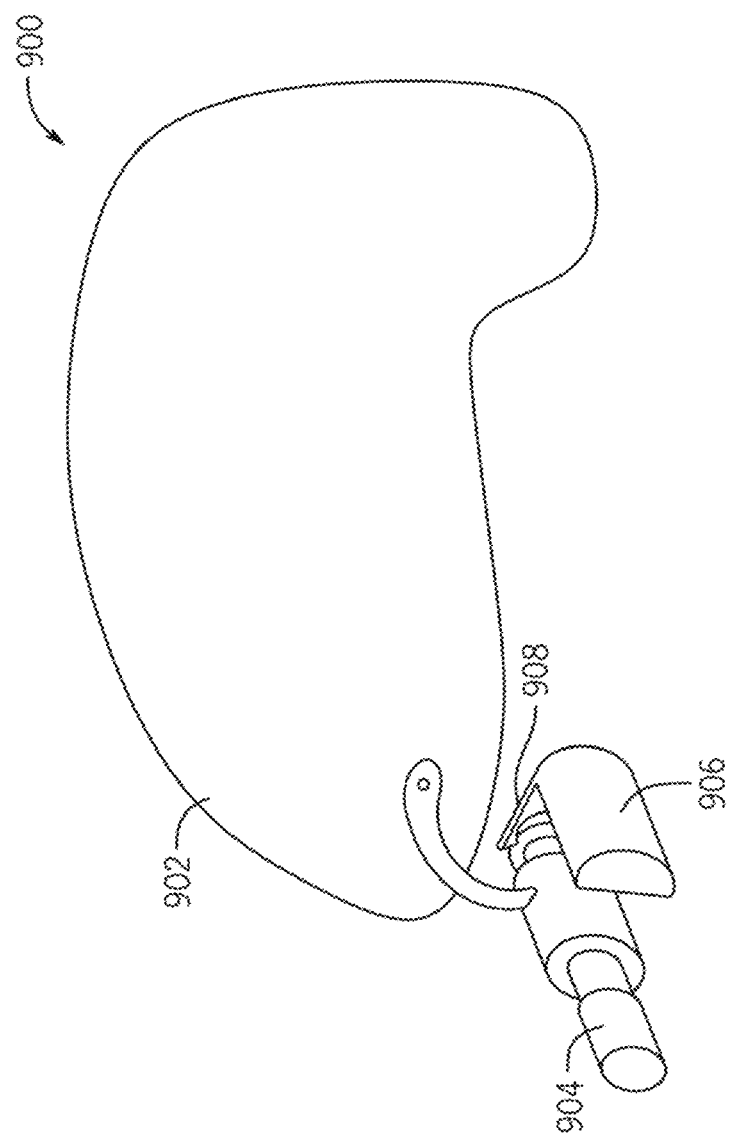
FIG. 9B illustrates multiple views of the nighttime device when combined with a night vision goggle, according to embodiments of the invention.

FIG. 9B illustrates an isometric view of a nighttime device when combined with a night vision goggle, according to embodiments of the invention. A helmet 902 is illustrated therein. A housing 906 contains the electro-optical system described above with respect to FIG. 1 or FIG. 2A. A waveguide mount 908 contains a waveguide display. The housing 906 is mechanically coupled to a night vision apparatus 904. The night vision apparatus 904 is mechanically coupled to the helmet 902. In one or more embodiments, Night vision apparatus 904 can be a left tube of a PVS-31 night vision apparatus. In other embodiments the nighttime device can be coupled to a right tube of the PVS-31 night vision apparatus. In yet other embodiments a nighttime device can be configured for simultaneous use with both the left tube and the right tube of a night vision apparatus.

Figure 10:
FIG. 10 illustrates a process to optically fuse image data, according to embodiments of the invention.

FIG. 10 illustrates, generally at 1000, a process to optically fuse image data, according to embodiments of the invention. With reference to FIG. 10, a process begins at a block 1002. At a block 1004 emitted light is generated from a display. A nonlimiting example of emitted light is 124a as described above in conjunction with the previous figures such as in FIG. 1. At a block 1006 emitted light is coupled into a waveguide display. A nonlimiting example of coupling emitted light into a waveguide display is 124b as described above in conjunction with FIG. 1. At a block 1008 emitted light is optically fused with light from an environment. A nonlimiting example of optically fusing emitted light is illustrated in FIG. 1 with 124c and 110. The process stops at a block 1010. The process of FIG. 10 applies to other figures contained herein. Reference to FIG. 1 is provided as an example and does not limit embodiments of the invention.

Figure 11:
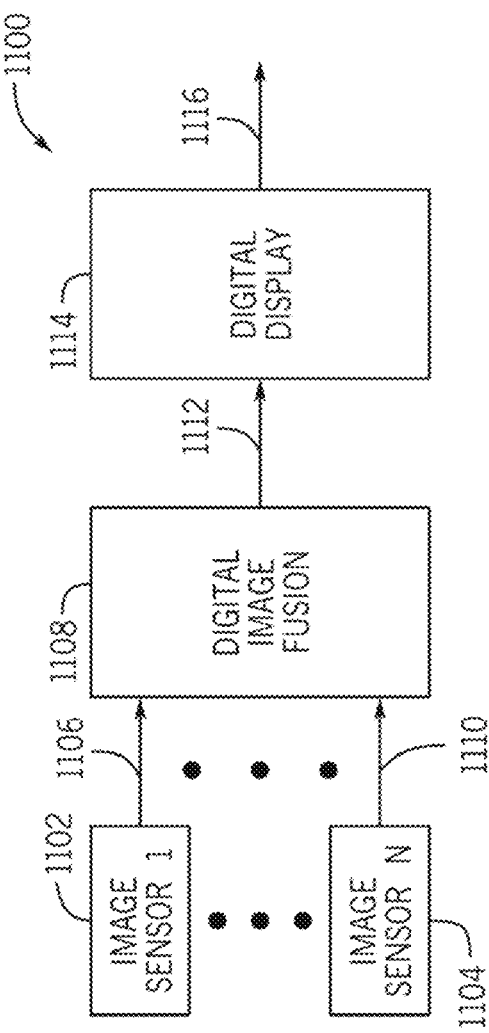
FIG. 11 illustrates a system architecture for combining digitally fused image data with optically fused image data, according to embodiments of the invention.

FIG. 11 illustrates, generally at 1100, a system architecture for combining digitally fused image data with optically fused image data, according to embodiments of the invention. With reference to FIG. 11, the system architecture illustrated provides digital fusion of sources of image data that are then optically fused in the nighttime device described above. Image sensor 1102 through a general number of N image sensors indicted at 1104 provide signals that are input (1106 through 1110) to digital image fusion block 1108. The Digital image fusion block digitally fuses the multiple images into a single output signal 1112 that is input to the display 1114. Display 1114 emits light 1116 responsive to the digitally fused input signal 1112.

In some embodiments, the system architecture described in conjunction with FIG. 11 is used to provide display input signal 120 in FIG. 1. Such a display input signal provides digitally fused first output light 124c which optically fuses with second output light 110 thereby combining digital image fusion with optical image fusion within a nighttime device.

Digital image sensors 1102 through 1104 can be tailored for specific embodiments. Some examples, given only for illustration, and with no limitation implied thereby are, alpha numeric image data, image data from a thermal sensor, image data from a short wavelength infrared band (SWIR) sensor, image data from a long wavelength light sensor, image data from a short wavelength light sensor, image data from a mid-wavelength light sensor, image data from a low light level night vision sensor, etc.

Digitally fusing image data at the block 1108 can be done according to various methods as are known to those of ordinary skill in the art.

Figure 12:
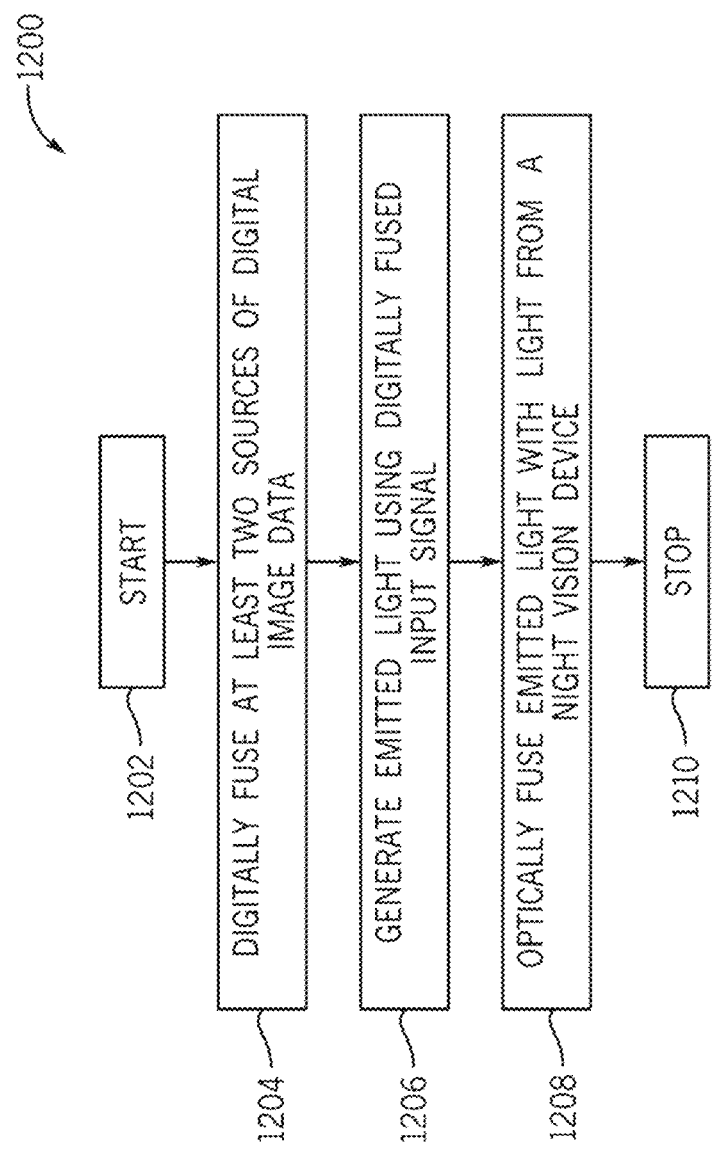
FIG. 12 illustrates a process to combine digitally fused image data with optically fused image data, according to embodiments of the invention

FIG. 12 illustrates, generally at 1200, a process to combine digitally fused image data with optically fused image data, according to embodiments of the invention. With reference to FIG. 12, a process starts at a block 1202.

At a block 1204 at least two sources of digital image data are digitally fused together. A nonlimiting example of digitally fusing image data is given above in conjunction with 1108 in FIG. 11.

At a block 1206 emitted light is generated from a display using the digitally fused input signal. A nonlimiting example of a digitally fused input signal is 1112 from FIG. 11.

At a block 1208 emitted light (created from a digitally fused input signal e.g., 1112) is optically fused with second output light from a night vision device. A nonlimiting example of optically fusing first output light and second output light from an analog night vision device is described above in conjunction with FIG. 1, such as for example 124c and 110. The process stops at a block 1210.

Figure 13:
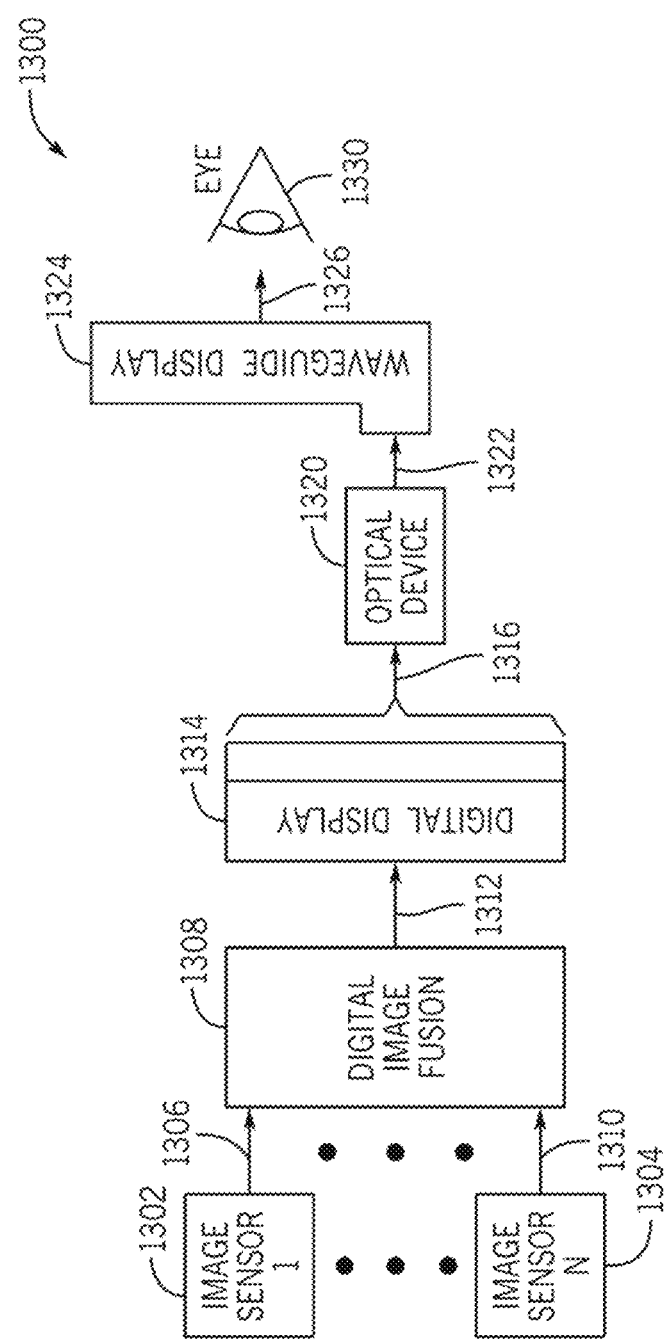
FIG. 13 illustrates a system architecture for digitally fusing image data, according to embodiments of the invention

FIG. 13 illustrates, generally at 1300, a system architecture for digitally fusing image data, according to embodiments of the invention. With reference to FIG. 13, a system is taught that provides a digital image solution for a nighttime device without using an analog night vision apparatus. The digital image system of FIG. 13 can be configured with one or more separate sources of digital image data.

A general number of N digital image sensors is represented in FIG. 13 starting with a first digital image sensor 1302 through an $N^{th}$ digital image sensor 1304. A digital image output signal 1306 is output from the first digital image sensor 1302 and is input to a digital image fusion block 1308. A digital image output signal 1310, from the $N^{th}$ digital image sensor 1304, is input to the digital image fusion block 1308. The digital image fusion block 1308 digitally fuses the multiple images (1306 through 1310) into a single output signal 1312 that is input to the display 1314. Display 1314 emits light 1316 responsive to the digitally fused input signal 1312. The emitted light 1316 is incident upon an optical device 1320. The optical device 1320 couples the emitted light 1316 from the display 1314 as input light 1322 into a waveguide display 1324. Output light 1326 from the waveguide display 1324 is observable by a user at 1330. In some embodiments an OLED display is used for 1314, as described above in conjunction with the previous figures.

Digital image sensors 1302 through 1304 can be tailored for specific embodiments. Some examples given only for illustration and with no limitation implied thereby are alpha numeric image data, image data from a thermal sensor, image data from a short wavelength infrared (SWIR) band sensor, image data from a long wavelength light sensor, image data from a short wavelength light sensor, image data from a mid-wavelength light sensor, image data from a low light level night vision sensor, etc.

In some embodiments digital image fusion block 1308 is not needed. In such embodiments, a single digital image sensor is used to provide a digital image input signal directly to the digital display 1314. Thereby providing a nighttime device that provides an enhanced view of the environment to a user through a waveguide display without an analog night vision apparatus.

Figure 14A:
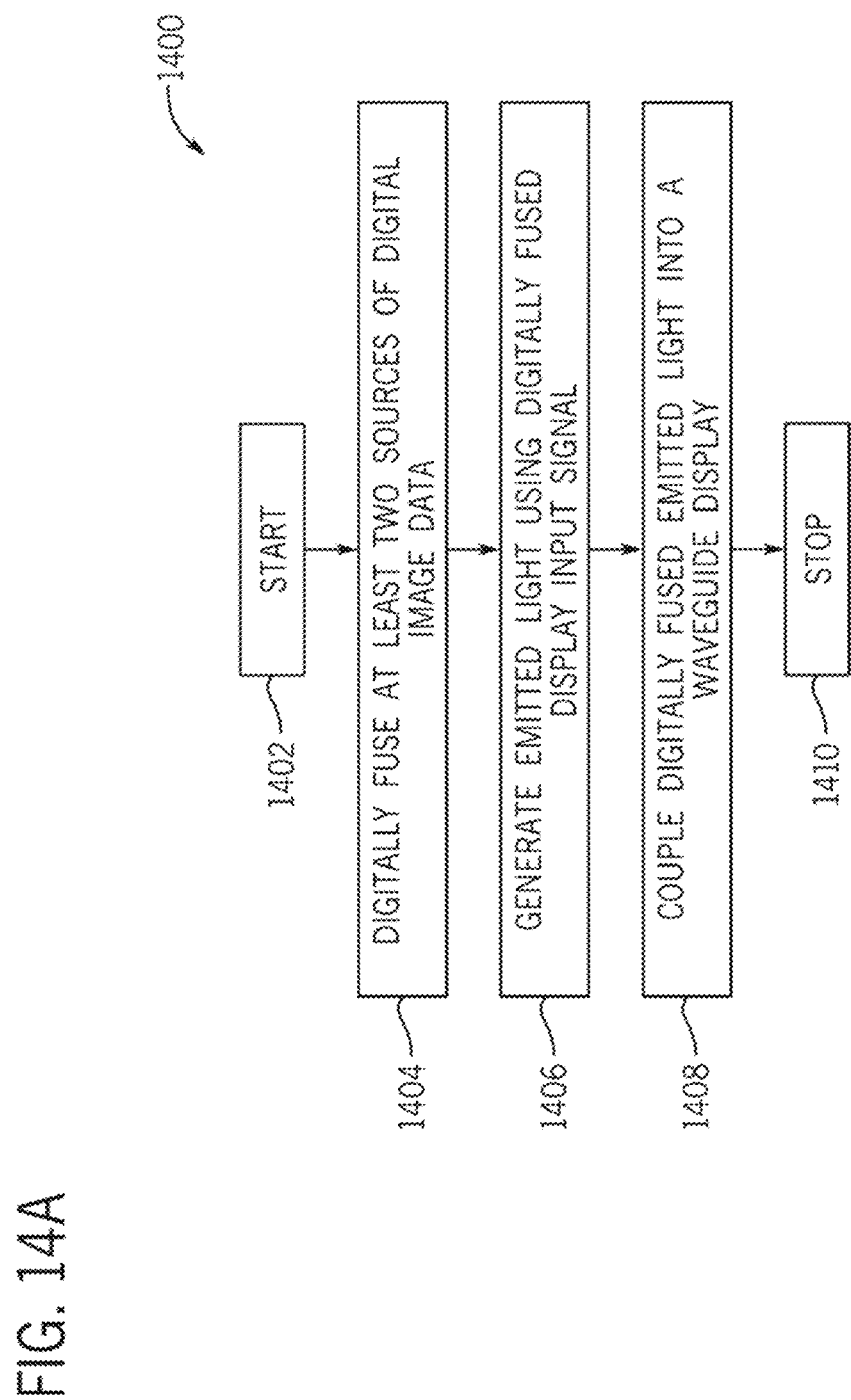
FIG. 14A illustrates a process for digitally fusing image data, according to embodiments of the invention.

FIG. 14A illustrates, generally at 1400, a process for digitally fusing image data, according to embodiments of the invention. With reference to FIG. 14A, a process starts at a block 1402.

At a block 1404 at least two sources of digital image data are digitally fused together. A nonlimiting example of digitally fusing image data is given above in conjunction with 1108 in FIG. 11 or 1308 in FIG. 13.

At a block 1406 emitted light is generated from a display using the digitally fused input signal. A nonlimiting example of a digitally fused input signal is 1112 from FIG. 11 or 1312 in FIG. 13.

At a block 1408 emitted light (created from a digitally fused input signal e.g., 1312) is coupled into a waveguide display. A nonlimiting example of coupling emitted light from a digital display into a waveguide display is illustrated in FIG. 13 with 1322 and 1324. The resulting coupled light into a waveguide display is visible to a user such as 1330 in FIG. 13. The process stops at a block 1410.

Figure 14B:
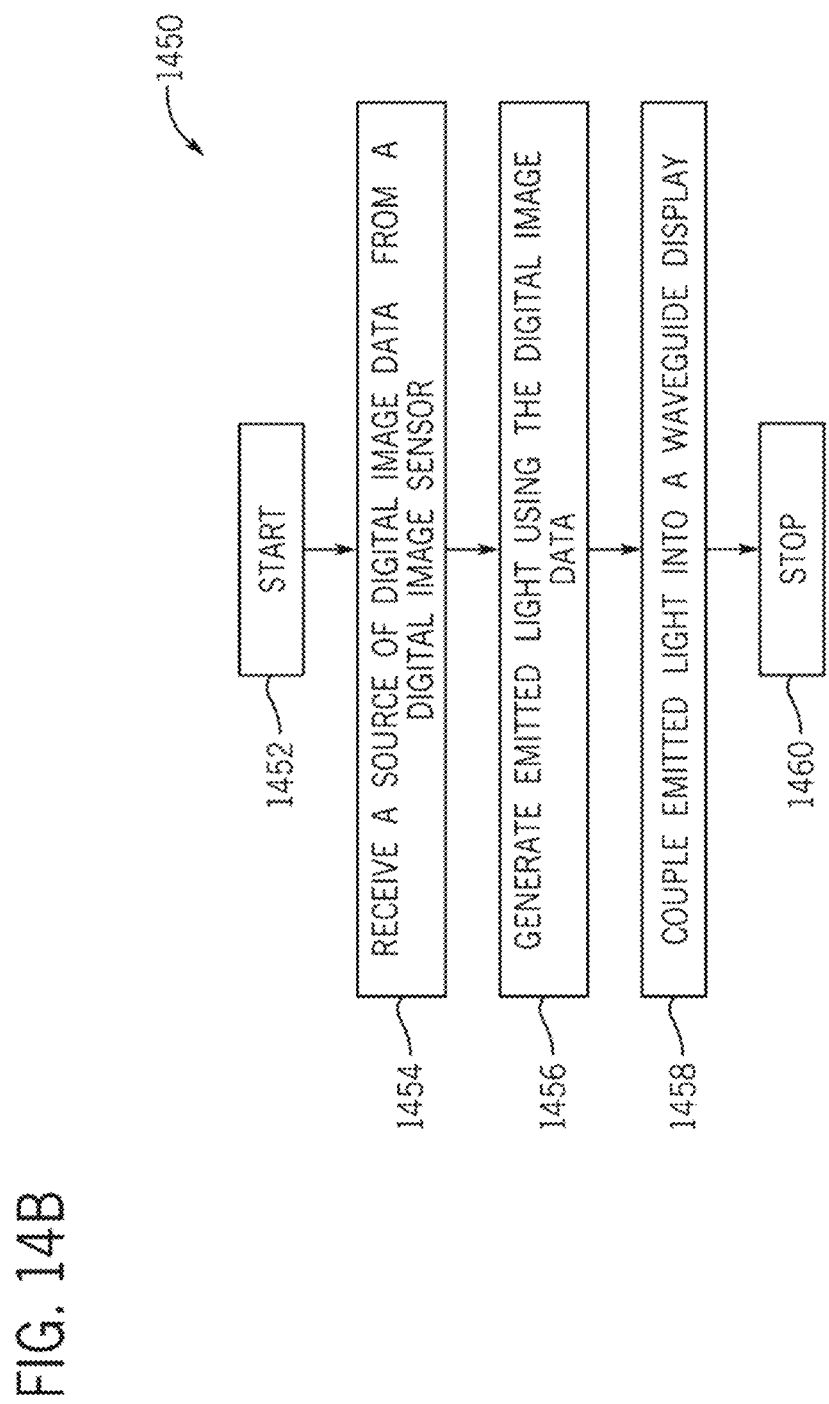
FIG. 14B illustrates a process for providing a nighttime device that does not use an analog night vision apparatus, according to embodiments of the invention.

FIG. 14B illustrates a process for providing a nighttime device that does not use an analog night vision apparatus, according to embodiments of the invention. With reference to FIG. 13 and FIG. 14B collectively, in some embodiments as described above, a digital image sensor 1302 provides an input signal to the digital display 1314, in such a case the digital image fusion block 1308 is not used. In such a system configuration, a process starts at a block 1452. At a block 1454, a source of digital image data is received by a digital image sensor. The digital image sensor can be any one of the digital image sensors described above. At a block 1456, emitted light is generated using digital image data as an input. In various embodiments, emitted light is generated using a display such as an OLED display. At a block 1458, emitted light is coupled into a waveguide display. Coupling emitted light into a waveguide display at 1458 is described above in conjunction with the preceding figures. The process stops at a block 1460.

Figure 15:
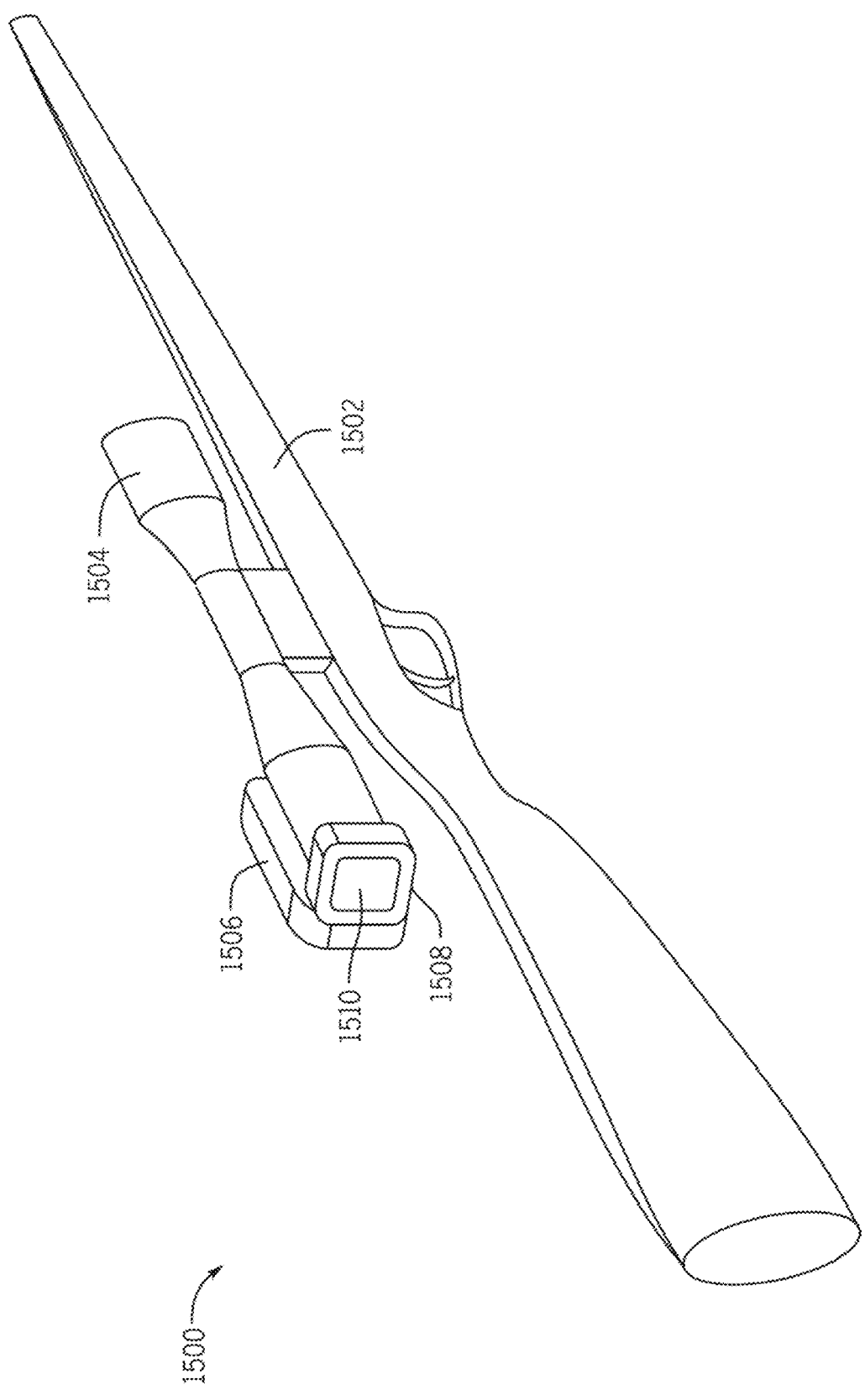
FIG. 15 illustrates combining a nighttime device with different head wearable and non-head wearable devices, according to embodiments of the invention.

FIG. 15 illustrates, generally at 1500, combining a nighttime device with a non-head wearable device, according to embodiments of the invention. With respect to FIG. 15, a gun 1502 is illustrated with a scope 1504. A nighttime device, as described in conjunction with the figures above is mechanically coupled to the scope 1504. A housing 1506 contains an electro-optical system similar to the one described above in conjunction with FIG. 2A including a waveguide mount 1508 and a waveguide display 1510. An analogue night vision device can be incorporated into the scope 1504 to permit optical fusion of first and second output light when passed through the waveguide display 1510. Or image data from various digital imaging sensors can be digitally fused and presented to a user through the waveguide display 1510 using modified electro-optical systems as described above in conjunction with, for example, FIG. 10 through FIG. 14A.

Data Used in the Augmented Reality View

As described above, the term "data" is understood to mean one or more or all of the following; text, symbols, maps, images, and fill motion video. In one or more embodiments, data is combined from Microelectromechanical Systems (MEMS)-based Inertial Measurement Unit (IMU) sensors in the display unit, with position data from an external device, such as Global Positioning System (GPS) data, from for example Android Team awareness Kit (ATAK). The user's "head pose" is calculated in order to estimate where the user is looking in the 3D space of the real-world. This calculated head pose is used to determine where to display/anchor augmented reality (AR) information in the head up display's (HUD's) field of view. Additionally, this custom application software algorithm communicates with ATAK, running on a user's end user device (EUD), to pull updated information/points of interest/new navigation routes/etc. into the data that is provided to the nighttime device for display to the user as an augmented reality view.

Auto Brightness Control & Power Control

Night vision apparatuses typically provide consistent light intensity to a user which is independent of ambient light intensity. In one or more embodiments, a brightness of a waveguide display used in a nighttime device is adjusted automatically based on a brightness of a night vision apparatus that the nighttime device is coupled to. Such automatic adjustment of a waveguide display brightness is accomplished with a brightness sensor and a light intensity control block that adjusts a brightness of the waveguide display.

In one or more embodiments power conservation is accomplished by turning off the nighttime device when a user moves the night vision apparatus up out of the user's field of view. Thereby conserving power when the nighttime device is not needed.

In various embodiments, some components of system are implemented in an integrated circuit device, which may include an integrated circuit package containing the integrated circuit. In some embodiments, the components of the system(s) are implemented in a single integrated circuit die. In other embodiments, the components of the system(s) are implemented in more than one integrated circuit die of an integrated circuit device which may include a multi-chip package containing the integrated circuit.

For purposes of discussing and understanding the embodiments of the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of embodiments of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, waveforms, data, time series or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the embodiments of the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk read-only memories (CD-ROMs), and magnetic-optical disks, read-only memories (ROMs), random access memories (RAMs), electrically programmable read-only memories (EPROM) s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, network PCs, minicomputers, mainframe computers, and the like. The invention can also be practiced in distributed computing environments where tasks are performed by remote processing devices that are linked through a communications network. In other examples, embodiments of the invention as described above can be implemented using a system on a chip (SOC), a Bluetooth chip, a digital signal processing (DSP) chip, a codec with integrated circuits (ICs) or in other implementations of hardware and software.

The methods of the embodiments of the invention may be implemented using computer software. If written in a programming language conforming to a recognized standard, sequences of instructions designed to implement the methods can be compiled for execution on a variety of hardware platforms and for interface to a variety of operating systems. In addition, embodiments of the present invention are not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, mathematical expression, flow diagram or flow chart. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

Non-transitory machine-readable media is understood to include any mechanism for storing information in a form readable by a machine (e.g., a computer). For example, a machine-readable medium, synonymously referred to as a computer-readable medium, includes read only memory (ROM); random access memory (RAM); magnetic disk storage media; optical storage media; flash memory devices; except electrical, optical, acoustical or other forms of transmitting information via propagated signals (e.g., carrier waves, infrared signals, digital signals, etc.); etc.

Thus, embodiments of the invention are used to provide head-up display systems using OLED displays in the night environment. Waveguide displays are used in the nighttime device without any reduction in situational awareness to a user. Thus, OLED displays are useful in the nighttime environment to provide augmented reality views for a user.

Embodiments of the invention are readily implemented in a wearable or a head wearable device of general configuration such as but not limited to glasses, goggles, a visor, a head band, a helmet, etc. or the like. Embodiments of the invention are also readily configurable into non-head wearable devices such as a gun site.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

While the invention has been described in terms of several embodiments, those of skill in the art will recognize that the invention is not limited to the embodiments described but can be practiced with modification and alteration within the spirit and scope of the appended claims. The description is thus to be regarded as illustrative instead of limiting.

What is claimed is:

1. An apparatus to optically fuse first output light containing visual data with second output light emitted from a night vision device, comprising:
   a waveguide display, the waveguide display is aligned relative to an eyepiece of the night vision device, such that when the waveguide display is in an ON state and the second output light exits the eyepiece, the second output light passes through the waveguide display;
   a display, the display having an input, the input is configured to receive a display input signal containing visual data, the display is configured to emit light responsive to the display input signal; and
   an optical device, the optical device is disposed between the display and the waveguide display, the optical device to couple emitted light from the display into the waveguide display, wherein, in the ON state, the waveguide display emits the first output light which optically fuses with the second output light wherein the night vision device has a data input and the second output light and the first output light are confined to separate portions of a field of view presented by the night vision device.

2. The apparatus of claim 1, wherein the apparatus is configured to mount on a head wearable device, and the head wearable device is selected from the group consisting of a helmet, glasses, googles, and a monocular.

3. The apparatus of claim 1, wherein the night vision device is a night vision google PVS-31.

4. The apparatus of claim 1, wherein the night vision device is a camera.

5. The apparatus of claim 1, wherein the night vision device is a gun site.

6. The apparatus of claim 1, wherein the display is an organic light emitting diode (OLED) display.

7. The apparatus of claim 1, wherein the optical device is a multielement optical device having a focal length of approximately 8 millimeters.

8. The apparatus of claim 1, wherein the visual data is selected from the group consisting of text, symbols, maps, images, and full motion video.

9. The apparatus of claim 1, wherein a brightness of the second output light is monitored and a brightness of the first output light is adjusted to maintain a constant brightness ratio of the first output light to the second output light.

10. The apparatus of claim 1, when a signal corresponding to rotation of the night vision device outside of a user's field of view is received the apparatus is to be powered down into sleep mode.

11. The apparatus of claim 1 wherein the display input signal contains a fused image.

12. The apparatus of claim 11, wherein the fused image results from a fusion process with an output signal from a digital image sensor.

13. The apparatus of claim 12, wherein the digital image sensor is selected from the group consisting of a thermal imaging sensor, a short wavelength infrared band imaging sensor, and a user selected imaging sensor.

14. A method to optically fuse first output light emitted from a waveguide display with second output light emitted from a night vision device, comprising:
   generating emitted light from a display, wherein the generating is responsive to a display input signal containing visual data;
   coupling the emitted light into the waveguide display to provide the first output light emitted from the waveguide display; and
   fusing the first output light with the second output light as the second output light passes through the waveguide display, wherein the night vision device has a data input and the second output light and the first output light are confined to separate portions of a field of view presented by the night vision device.

15. The method of claim 14, wherein the waveguide display is configured to mount on a head wearable device, and the head wearable device is selected from the group consisting of a helmet, glasses, googles, and a monocular.

16. The method of claim 14, wherein the night vision device is a night vision google PVS-31.

17. The method of claim 14, wherein the night vision device is a camera.

18. The method of claim 14, wherein the night vision device is a gun site.

19. The method of claim 14, wherein the display is an organic light emitting diode (OLED) display.

20. The method of claim 14, wherein an optical device is used for the coupling and the optical device is a multielement optical device.

21. The method of claim 14, wherein the visual data is selected from the group consisting of text, symbols, maps, images, and full motion video.

22. The method of claim 14, further comprising:
   monitoring a brightness of second output light; and
   adjusting a brightness of the first output light based on the monitoring to maintain a constant brightness ratio of the first output light to the second output light.

23. The method of claim 14, further comprising:
   receiving a signal corresponding to rotation of the night vision device; and
   powering down into sleep mode when the night vision device is outside of a user's field of view.

24. The method of claim 14 wherein the display input signal contains a fused image.

25. The method of claim 24, wherein the fused image results from a fusion process with an output signal from a digital image sensor.

26. The method of claim 25, wherein the digital image sensor is selected from the group consisting of a thermal imaging sensor, a short wavelength infrared band imaging sensor, and a user selected imaging sensor.

27. An apparatus to optically fuse first output light containing visual data with second output light emitted from a night vision device, comprising:
   a waveguide display, the waveguide display is aligned relative to an eyepiece of the night vision device, such that when the waveguide display is in an ON state and the second output light exits the eyepiece, the second output light passes through the waveguide display;
   a display, the display having an input, the input is configured to receive a display input signal containing visual data, the display is configured to emit light responsive to the display input signal; and
   an optical device, the optical device is disposed between the display and the waveguide display, the optical device to couple emitted light from the display into the waveguide display, wherein, in the ON state, the waveguide display emits the first output light which optically fuses with the second output light, wherein a brightness of the second output light is monitored and a brightness of the first output light is adjusted to maintain a constant brightness ratio of the first output light to the second output light.

28. The apparatus of claim 27, wherein the apparatus is configured to mount on a head wearable device, and the head wearable device is selected from the group consisting of a helmet, glasses, googles, and a monocular.

29. The apparatus of claim 27, wherein the night vision device is a night vision google PVS-31.

30. The apparatus of claim 27, wherein the night vision device is a camera.

31. The apparatus of claim 27, wherein the night vision device is a gun site.

32. The apparatus of claim 27, wherein the display is an organic light emitting diode (OLED) display.

33. The apparatus of claim 27, wherein the optical device is a multielement optical device having a focal length of approximately 8 millimeters.

34. The apparatus of claim 27, wherein the night vision device does not have a data input.

35. The apparatus of claim 27, wherein the night vision device has a data input and the second output light and the first output light are confined to separate portions of a field of view presented by the night vision device.

36. The apparatus of claim 27, wherein the visual data is selected from the group consisting of text, symbols, maps, images, and full motion video.

37. The apparatus of claim 27, when a signal corresponding to rotation of the night vision device outside of a user's field of view is received the apparatus is to be powered down into sleep mode.

38. The apparatus of claim 27 wherein the display input signal contains a fused image.

39. The apparatus of claim 38, wherein the fused image results from a fusion process with an output signal from a digital image sensor.

40. The apparatus of claim 39, wherein the digital image sensor is selected from the group consisting of a thermal imaging sensor, a short wavelength infrared band imaging sensor, and a user selected imaging sensor.

41. A method to optically fuse first output light emitted from a waveguide display with second output light emitted from a night vision device, comprising:
generating emitted light from a display, wherein the generating is responsive to a display input signal containing visual data;
coupling the emitted light into the waveguide display to provide the first output light emitted from the waveguide display;
fusing the first output light with the second output light as the second output light passes through the waveguide display;
monitoring a brightness of the second output light; and
adjusting a brightness of the first output light based on the monitoring to maintain a constant brightness ratio of the first output light to the second output light.

42. The method of claim 41, wherein the waveguide display is configured to mount on a head wearable device, and the head wearable device is selected from the group consisting of a helmet, glasses, googles, and a monocular.

43. The method of claim 41, wherein the night vision device is a night vision google PVS-31.

44. The method of claim 41, wherein the night vision device is a camera.

45. The method of claim 41, wherein the night vision device is a gun site.

46. The method of claim 41, wherein the display is an organic light emitting diode (OLED) display.

47. The method of claim 41, wherein an optical device is used for the coupling and the optical device is a multielement optical device.

48. The method of claim 41, wherein the night vision device does not have a data input.

49. The method of claim 41, wherein the night vision device has a data input and the second output light and the first output light are confined to separate portions of a field of view presented by the night vision device.

50. The method of claim 41, wherein the visual data is selected from the group consisting of text, symbols, maps, images, and full motion video.

51. The method of claim 41, further comprising:
receiving a signal corresponding to rotation of the night vision device; and
powering down into sleep mode when the night vision device is outside of a user's field of view.

52. The method of claim 41 wherein the display input signal contains a fused image.

53. The method of claim 52, wherein the fused image results from a fusion process with an output signal from a digital image sensor.

54. The method of claim 53, wherein the digital image sensor is selected from the group consisting of a thermal imaging sensor, a short wavelength infrared band imaging sensor, and a user selected imaging sensor.

* * * * *